United States Patent
Kim et al.

(10) Patent No.: US 7,552,005 B2
(45) Date of Patent: Jun. 23, 2009

(54) METHOD FOR FAULT DIAGNOSIS OF A TURBINE ENGINE

(75) Inventors: Kyusung Kim, Plymouth, MN (US); Charles M. Ball, Gilbert, AZ (US); Emmanuel O. Nwadiogbu, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 873 days.

(21) Appl. No.: 10/802,151

(22) Filed: Mar. 16, 2004

(65) Prior Publication Data

US 2005/0209767 A1 Sep. 22, 2005

(51) Int. Cl.
  G06F 17/00 (2006.01)
  G06F 7/00 (2006.01)
  G01M 17/00 (2006.01)
  B60Q 1/00 (2006.01)
  H02P 25/00 (2006.01)

(52) U.S. Cl. .......................... 701/100; 701/29; 701/35; 701/33; 701/9; 701/34; 701/8; 701/99; 701/10; 701/106; 706/52; 706/50; 706/45; 340/438; 340/439; 73/112.01

(58) Field of Classification Search ............... 701/29, 701/35, 33, 9, 100, 34, 8, 99, 101, 106–108; 702/179, 182–185; 706/50, 45, 52; 340/438, 340/439; 318/799; 73/112.01
See application file for complete search history.

(56) References Cited

U.S. PATENT DOCUMENTS

| | | | | |
|---|---|---|---|---|
| 5,018,069 | A * | 5/1991 | Pettigrew | 701/35 |
| 5,311,421 | A * | 5/1994 | Nomura et al. | 700/37 |
| 5,313,407 | A * | 5/1994 | Tiernan et al. | 700/280 |
| 5,467,025 | A * | 11/1995 | Ray | 324/772 |
| 6,216,066 | B1 * | 4/2001 | Goebel et al. | 701/29 |
| 6,314,413 | B1 | 11/2001 | Otte | |
| 6,393,355 | B1 * | 5/2002 | Muramatsu | 701/100 |
| 6,408,259 | B1 * | 6/2002 | Goebel et al. | 702/183 |
| 6,532,392 | B1 * | 3/2003 | Eryurek et al. | 700/54 |
| 6,557,118 | B2 * | 4/2003 | Schleiss et al. | 714/37 |
| 6,590,362 | B2 * | 7/2003 | Parlos et al. | 318/799 |
| 6,606,580 | B1 | 8/2003 | Zedda et al. | |
| 6,615,090 | B1 * | 9/2003 | Blevins et al. | 700/26 |
| 6,804,600 | B1 * | 10/2004 | Uluyol et al. | 701/100 |

(Continued)

OTHER PUBLICATIONS

Teuvo Kohonen, "The Self-Organizing Map," Proceedings of the IEEE, vol. 78, No. 9, Sep. 1990, pp. 1464-1480.

*Primary Examiner*—Khoi Tran
*Assistant Examiner*—Ian Jen
(74) *Attorney, Agent, or Firm*—Ingrassia Fisher & Lorenz, P.C.

(57) ABSTRACT

A method of diagnosing a turbine engine includes the steps of acquiring engine operating parameters; calculating corresponding engine residual values; computing the mean and the standard deviation of each engine residual value; normalizing dynamically each engine residual value to yield normalized engine residuals; mapping, via a cluster technique mapping, the normalized engine residuals as input vectors into an engine condition space having clusters representing either normal vector engine conditions or faulty vector engine conditions; and identifying a closest cluster within the engine condition space to determine whether the engine under analysis is normal or faulty. A belief factor may be obtained as a function of the distances between the input vectors and specific clusters.

40 Claims, 2 Drawing Sheets

U.S. PATENT DOCUMENTS

| | | |
|---|---|---|
| 6,868,325 B2 * | 3/2005 | Menon et al. ............... 701/100 |
| 6,905,827 B2 * | 6/2005 | Wohlgemuth et al. .......... 435/6 |
| 7,043,348 B2 * | 5/2006 | Uluyol et al. ............... 701/100 |
| 2002/0066054 A1 | 5/2002 | Jaw et al. |
| 2002/0100278 A1 * | 8/2002 | He et al. ....................... 60/600 |
| 2002/0148224 A1 * | 10/2002 | Propernick ................... 60/606 |
| 2003/0018928 A1 | 1/2003 | James et al. |
| 2003/0088809 A1 | 5/2003 | Gulati et al. |
| 2004/0176879 A1 * | 9/2004 | Menon et al. .................. 701/1 |
| 2004/0176901 A1 * | 9/2004 | Uluyol et al. ............... 701/100 |
| 2005/0021212 A1 * | 1/2005 | Gayme et al. ................. 701/99 |
| 2005/0288901 A1 * | 12/2005 | Mylaraswamy et al. ..... 702/185 |
| 2006/0195248 A1 * | 8/2006 | Kim et al. ................... 701/100 |

* cited by examiner

METHOD FOR FAULT DIAGNOSIS OF A TURBINE ENGINE

BACKGROUND OF THE INVENTION

The present invention generally relates to performing fault diagnosis of turbine engines and, more specifically, to an automated method for providing such fault diagnosis.

The gas turbine propulsion engine is one of the most critical subsystems within an aircraft. A great deal of research has been carried out in the field of gas turbine propulsion engine fault diagnosis and prognosis. The process of diagnosis requires adequate operating data input which is not always available or provided. The mid-sized jet propulsion engine, in particular, may typically be operated with less-expensive data acquisition systems, because of cost constraints incurred in design and operation, and the quality of operating data output suffers as a result. For example, engine output data may be recorded only during certain pre-determined operating intervals of time. Accordingly, only a limited number of parameters related to the core engine performance are routinely recorded and available for analysis. Moreover, conventional diagnostic methods typically fail to take into account operating differences resulting from engine-to-engine manufacturing variations.

Many of the heuristics derived from an expert's knowledge and understanding of engine performance are not systematic in nature. Accordingly, the current practice in the field has mostly relied on manual trending of the observations as performed by the experts. Although the present state of the art discloses unconventional methods for enhancing manual observation and control, such as the method incorporating a self-organizing map for controlling process events of a technical plant taught by U.S. Pat. No. 6,314,413 issued to Otte, such procedures are not generally applicable to the diagnosis and prognosis methods required in the maintenance and operation of the gas turbine engine. In addition, conventional methods of engine diagnosis may not provide a confidence level or belief factor for a determination that the engine condition is faulty or normal.

As can be seen, there is a need for an improved method of performing fault diagnosis and prognosis of turbine engines.

SUMMARY OF THE INVENTION

In accordance with the present invention, a method of analyzing a turbine engine comprises acquiring an engine operating parameter; calculating an engine residual value from the engine operating parameter; normalizing the engine residual value to yield a normalized engine residual; mapping the normalized engine residual as an input vector into an engine condition space having a plurality of clusters, each cluster representing either a normal engine condition or a faulty engine condition; and identifying a closest cluster within the engine condition space to determine whether the engine under analysis is normal or faulty.

In another aspect of the present invention, there is provided a computer readable medium having computer-executable instructions for performing a method, wherein the method comprises calculating an engine residual value from data generated from an engine model and from engine operating data collected in the field; normalizing the engine residual value to yield a normalized engine residual; mapping, via a self-organizing map, the normalized engine residual as an input vector into an engine condition space having a plurality of clusters, each cluster representing either a normal engine condition or a faulty engine condition; and identifying a closest cluster within the engine condition space to determine whether the engine condition is normal or faulty.

In yet another aspect of the present invention, a method of analyzing a turbine engine to determine a normal or faulty condition comprises acquiring a plurality of engine operating parameters; calculating a corresponding plurality of engine residual values by comparing each of the engine operating parameters with standard engine characteristics obtained from an engine model; computing the mean and the standard deviation of each engine residual value obtained from a normally operating baseline engine; normalizing each engine residual value by normalizing the mean to zero and by normalizing the standard deviation to unity to yield a plurality of normalized engine residuals, the step of normalizing dynamically using normalization factors obtained from a parameter distribution of a normally-operating baseline engine; mapping the normalized engine residuals as input vectors into an engine condition space having a plurality of clusters, each cluster representing either a normal engine condition or a faulty engine condition; and identifying a closest cluster within the engine condition space, the closest cluster being closer to the input vectors than any other of the plurality of clusters, the closest cluster representation determining whether the engine under analysis is normal or faulty.

In still another aspect of the present invention, a method of analyzing a turbine engine to determine a normal or faulty condition comprises training a self-organizing map by inputting data from a plurality of reference turbine engines; acquiring a core speed reading, an exhaust gas temperature reading, and a fuel flow reading for the engine under analysis; calculating a core speed residual value, an exhaust gas temperature residual value, and a fuel flow residual value by comparing the core speed reading, the exhaust gas temperature reading, and the fuel flow reading with corresponding standard engine characteristics obtained from an engine model; computing the mean and the standard deviation of each of the core speed residual value, the exhaust gas temperature residual value, and the fuel flow residual value which are obtained from a normally operating baseline engine; normalizing each of the core speed residual value, the exhaust gas temperature residual value, and the fuel flow residual value by normalizing the respective means to zero and by normalizing the respective standard deviations to unity to yield a normalized core speed residual, a normalized exhaust gas temperature residual, and a normalized fuel flow residual; mapping, via the self-organizing map, the normalized core speed residual, the normalized exhaust gas temperature residual, and the normalized fuel flow residual as respective input vectors into an engine condition space having a plurality of clusters, each cluster representing either a normal engine condition or a faulty engine condition; and identifying a closest cluster within the engine condition space, the closest cluster being closer to the input vectors than any other of the plurality of clusters, the closest cluster representation determining whether the engine under analysis is normal or faulty.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Using the disclosed method for fault diagnosis of a turbine engine, aircraft maintenance personnel, for example, can establish whether a turbine engine under analysis is operating normally or may have a faulty condition. The maintenance personnel can input parameter values, obtained in the process of routine maintenance or obtained from flight data recorded in the field, into a diagnostic computer, for example, and derive a diagnosis or prognosis output along with a confidence level indication, or belief factor, for the analysis. The failure modes addressed may include failures related to the turbine engine combustor liner, bleed system, and exhaust gas temperature sensors.

The diagnostic process uses a mapping technique to automatically correlate the inputted parameter values to a probable engine operating condition selected from a plurality of normal and faulty engine operating conditions previously "learned" by the mapping technique, to derive the engine condition diagnosis and provide the confidence level to the maintenance personnel.

The disclosed method for fault diagnosis further allows aircraft operators to perform preventive maintenance, by anticipating potential faulty conditions, and thus achieve a reduction in engine operating costs. Conventional diagnosis methods, in comparison, may need to rely on the intervention of a highly-trained operator having expert knowledge and understanding of the engine operating characteristics because of the limited operating data normally obtained during aircraft maintenance. In addition, conventional diagnosis methods typically do not provide a prognosis and confidence indication for the engine. Without such reliable prognosis, there remains the potential for aircraft flight delays and cancellations, unscheduled engine removals, and takeoff aborts, thus increasing engine operating costs.

In one embodiment, which can best be described with reference to a flow diagram 10 of FIGS. 1A-B, a core speed residual 11, an exhausted gas temperature residual 13, and a fuel flow residual 15 can be derived using an engine model, such as an empirical engine model or a first principle model. The first principle engine model may be based on a set of differential equations representing dynamics of the engine undergoing analysis and fault diagnosis. The empirical engine model may be expressed by a polynomial function of engine fan speed and ambient conditions such as ambient temperature, altitude and mach number. The engine model may be developed for a defined air bleed condition during takeoff, for example. An air bleed system removes compressed air from a compressor intermediate stage and bleeds the air into the atmosphere. During rapid transients, such as accelerations and decelerations, the bleed system is automatically opened and maintained open until the selected engine speed or power has been reached.

Alternatively, the empirical engine model may be expressed as a neural network model of the engine operating parameters. A neural network is an information processing paradigm similar to the method by which biological nervous systems, such as the brain, process information. Neural networks are characterized by powerful pattern matching and predictive capabilities in which input variables interact heavily to provide for modeling of nonlinear, complex dynamic systems. The neural network comprises a large number of highly interconnected processing elements (e.g., neurons) working in unison to solve specific problems. In biological systems the process of "learning" involves adjustments to the synaptic connections that exist between the neurons. In the present method, the neural network is not explicitly programmed but rather is trained through exposure to real-time or to historical data.

A set of comparisons can be made, at constant engine fan speed and given ambient conditions, by taking measured vital engine performance parameters (i.e., engine operating data collected in the field by acquiring a core speed reading, an exhausted gas temperature reading, and a fuel flow reading) for an engine being analyzed, and comparing the readings with a set of corresponding standard engine characteristics or performance parameters for the engine model. The numerical differences between these two sets of performance parameters yield the core speed residual 11, the exhausted gas temperature residual 13, and the fuel flow residual 15. Recorded data comprising the engine performance parameters can be corrected to Sea Level International Standard Day conditions using altitude data so as to remove the effects of varying environmental conditions. Derivation of the residuals can be represented as, $$\text{residual} = (\text{datum}_{field} - \text{datum}_{empirical})$$

The mean of the core speed residual 11 and the standard deviation of the core speed residual 11 can be computed at step 17. The mean of the core speed residual 11 can be normalized to zero and the standard deviation of the core speed residual 11 can be normalized to unity, at step 19, to obtain a normalized core speed residual 21 by using normalization factors. Normalization factors which are equivalent to the mean and standard deviation obtained at step 17 can be obtained from the parameter distribution of a normally-operating engine, herein referred to as a baseline engine.

The normalization factors may be dynamically updated by obtaining engine performance parameters when the engine condition is determined to be normal. In accordance with the present method, the normalization factors are continually updated as additional engine performance parameters are acquired from the normally operating engine obtained in the field and during routine engine inspections. Engine performance parameters obtained from an engine determined to be faulty are not included in an updated normalization factor.

An updated mean normalization factor may be obtained by: i) multiplying the current mean normalization factor by a first fraction to obtain a first product, ii) obtaining a current engine parameter from a normally-operating turbine engine, iii) multiplying the current engine parameter by a second fraction to obtain a second product, and iv) adding the first and second products to yield the updated mean deviation normalization factor, in accordance with the following expression, $$NF1_{p+1} = \frac{n-1}{n} NF1_p + \frac{1}{n} x_p$$

where NF1 is a mean normalization factor,
subscript p stands for a current time step,
subscript p+1 stands for a step subsequent to the current time step p, n is the total number of samples accumulated at time step p, and $x_p$ are updated engine parameters.

An updated standard deviation normalization factor may be obtained from a current standard deviation normalization factor by: i) multiplying the square of the current standard deviation normalization factor by a third fraction to obtain a third product, ii) subtracting the updated mean normalization factor from the current engine parameter and multiplying the square of the result by a fourth fraction to obtain a fourth product, iii) subtracting the current mean normalization factor from the current engine parameter and multiplying the square of the result by the second fraction to obtain a fifth product, and iv) taking the square root of the sum of the third, fourth, and fifth products to yield the updated standard deviation, in accordance with the following expression, $$NF2_{p+1} = \sqrt{\left[\frac{n-2}{n-1}NF2_p^2 + \frac{1}{n-1}(x_p - NF1_{p+1})^2 + \frac{(x_p - NF1_p)^2}{n}\right]}$$

where NF2 is a standard deviation normalization factor. The mean and standard deviations may be used as slope and intercept coefficients, respectively, in a linear transformation, at step 19.

As can be appreciated by one skilled in the art, it is not necessary to store all the engine parameters to obtain an updated normalization factor. The only information required to update the normalization factors are the updated engine parameters and the normalization factors obtained in a previous time step. Accordingly, normalization factors can be updated dynamically resulting in a more accurate estimation of a baseline engine distribution without requiring large memory resources in which to store previously-obtained engine operating parameters.

As may further be appreciated by one skilled in the relevant art, the baseline engine distribution can differ from one engine to another because of variations in the respective engine component fabrication tolerances and in the manufacturing procedures for the engines. Therefore, an individual baseline engine distribution may be obtained for each turbine engine undergoing analysis.

The mean of the exhausted gas temperature residual 13 and the standard deviation of the exhausted gas temperature residual 13 can be computed at step 23. The mean of the exhausted gas temperature residual 13 can be normalized to zero and the standard deviation of the exhausted gas temperature residual 13 can be normalized to unity, at step 25, to obtain a normalized exhaust gas temperature residual 27. The mean of the fuel flow residual 15 and the standard deviation of the fuel flow residual 15 can be computed at step 29. The mean of the fuel flow residual 15 can be normalized to zero and the standard deviation of the fuel flow residual 15 can be normalized to unity, at step 31, to obtain a normalized fuel flow residual 33.

The normalized core speed residual 21, the normalized exhausted gas temperature residual 27, and the normalized fuel flow residual 33 can be inputted as three corresponding input vectors to a clustering technique mapping, at step 35. As understood by one skilled in the art, a clustering technique mapping involves the task of grouping data points into homogeneous classes or "clusters" so that data points in the same cluster are substantially similar and data points in different clusters are essentially dissimilar.

A primary concept in the clustering of data points is that a cluster comprises points separated by distances which are small in comparison to the distances between clusters. Alternatively, clustering can be thought of as a form of data compression, where a large number of data points are mapped into a smaller number of representative clusters. The degree of similarity and of difference between individual observations are used to define the clusters, and to assign data points to clusters at varying degrees of aggregation.

The clustering technique mapping, in step 35, may comprise a self-organizing mapping operation. As understood by one skilled in the relevant art, a self-organizing map is a class of neural network which is 'trained' to structure itself using input signals. See, for example, Teuvo Kohonen, "The Self-Organizing Map," Proceedings of the IEEE, Volume 78, Number 9, September 1990, pp. 1464-1480, incorporated herein by reference.

Figure 1A:
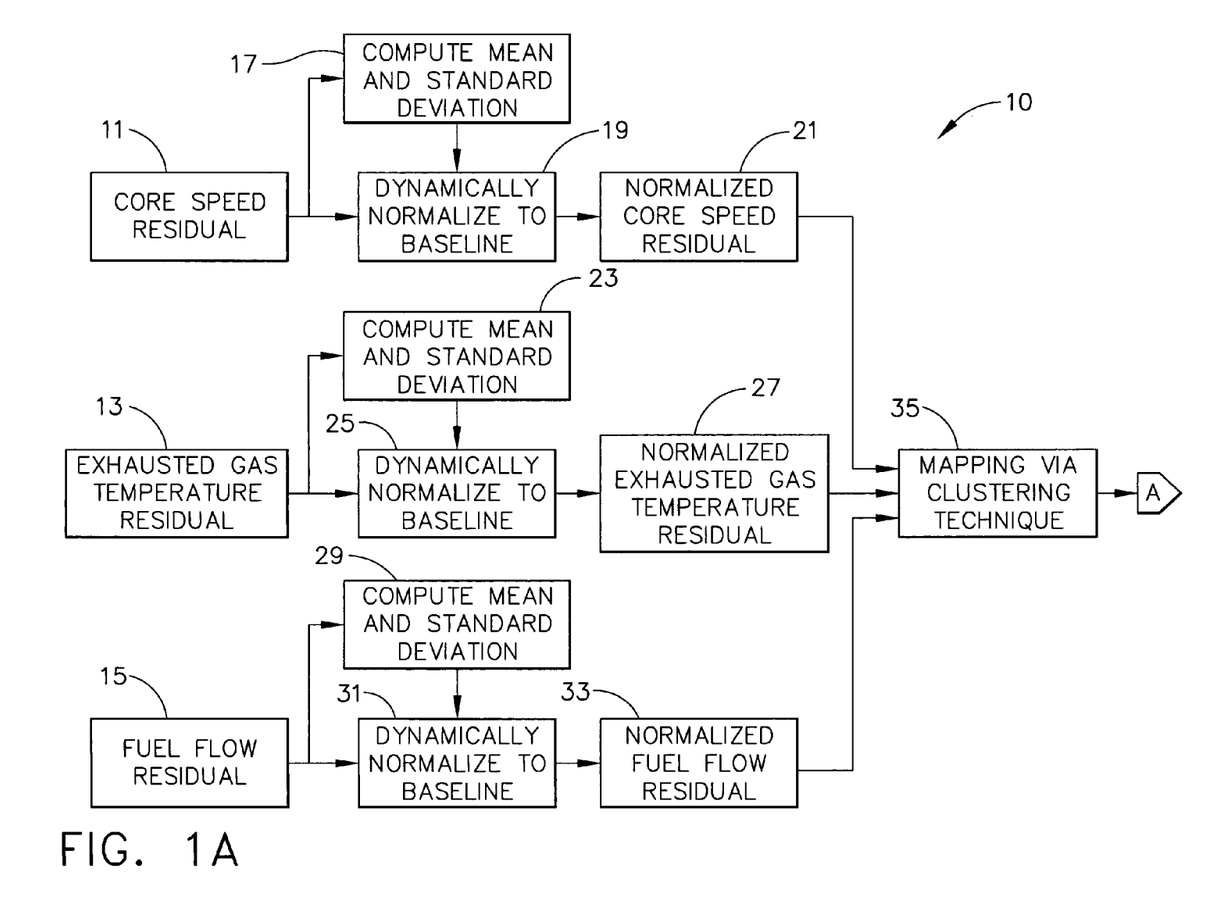
FIGS. 1A and 1B jointly show a flow diagram schematically representing a method for mapping acquired engine operating parameters or data values into an engine condition space from which an engine diagnosis and a belief factor can be obtained, according to the instant invention.
Figure 1B:
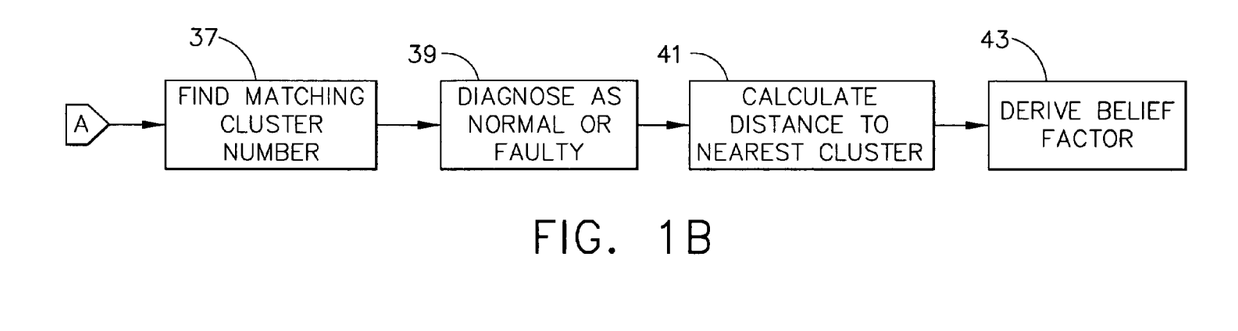

In the method of FIGS. 1A-B, the self-organizing map, which is a specific type of clustering algorithm forming neurons on a regular grid, may comprise a plurality of clusters, wherein each cluster may indicate or represent vector engine conditions, including both normal and faulty vector engine conditions. The self-organizing map 'learns' to recognize groups of similar input vectors in such a way that neurons physically near one another in a neuron layer respond to similar input vectors.

In an alternative embodiment, the clustering technique mapping may comprise adaptive resonance theory, in which a central feature of an adaptive resonance theory system is a pattern-matching process, or vector classifier, that compares an external data input (i.e., an input vector) with an internal memory of an active code (i.e., a stored pattern). The input vector is classified into a category depending on the stored pattern the vector most closely resembles Adaptive resonance theory matching leads either to a resonant state or to a parallel memory search. If the search ends at an established code, a memory representation of the data may either remain the same or incorporate new data from matched portions of a current data input. If the search ends at a new code, the memory representation "learns" the current data input. In other words, once a stored pattern is found, the pattern is modified to resemble the input vector. If the input vector does not match any stored pattern within a certain predetermined tolerance, then a new category is created in memory by storing a new pattern similar to the original input vector.

In another alternate embodiment, the clustering technique mapping may comprise a least-squares partitioning method known as a K-means algorithm. The K-means algorithm functions by dividing a collection of objects into a plurality of K groups. The K-means algorithm iterates over two steps. First, the mean of each cluster is computed. The initial assignment of points to clusters can be done randomly. Second, the distance of each point from each cluster mean is computed, and each point is assigned to a nearest cluster. The iteration is repeated over the above two steps until the sum of "squared within group errors" (i.e., the distances of the points to the respective group means) is minimized and the function converges. The cluster groups obtained by this method are essentially as geometrically compact as possible around respective cluster means.

In yet another alternate embodiment, the clustering technique mapping may comprise a method employing a Gaussian mixture model. The Gaussian mixture method provides a probabilistic version of the traditional K-means algorithm. However, whereas the traditional K-means algorithm represents clusters only in terms of the cluster centroids, the Gaussian mixture model operates on the basis that each cluster corresponds to an identifiable distribution of samples (i.e., engine parameters). Th Gaussian mixture method comprises a two-step iteration. First, via an "expectation step," an initial quantity of 'k' arbitrary centroids may be defined and a partial assignment of samples to clusters may be based on probabilities that the Gaussian mixture model assigns to the plurality of engine parameter samples. Second, via a "maximization step," the 'k' centroids are adjusted in conformance to the weighted means of the assigned samples. This two-step iteration is repeated until the sizes of adjustments required fall below a predefined threshold.

Accordingly, the clustering technique mapping, at step 35, can map an observation comprising a set of three input vectors (e.g., the normalized core speed residual 21, the normalized exhausted gas temperature residual 27, and the normalized fuel flow residual 33) into a nearest cluster to obtain a matching cluster number, at step 37. By interpreting the matching cluster number, the condition of the engine being analyzed can be determined and a failure (if present) can be diagnosed. The clustering technique mapping of residuals into engine condition space can be represented as, $$\text{normalized residual} \overset{CM}{\Rightarrow} \text{engine condition space}$$

The engine condition space may include various failure modes of interest including, for example, combustor liner burn-through failure, bleed band leakage failure, and exhaust gas temperature sensor failure. In one embodiment of the present invention, which used a self-organizing mapping method, the self-organizing map was trained for 1000 epochs, including data obtained from ten different reference turbine engines, and produced the cluster number relationship to vector engine condition shown in Table 1. A normal vector engine condition is indicated by a 'no trigger' condition.

TABLE 1

| Cluster Number | Vector Engine Condition |
|---|---|
| 1 through 9 | No Trigger |
| 10 | EGT Sensor Failure Trigger (measuring lower than it should be) |
| 11 | EGT Sensor Failure Trigger (measuring higher than it should be) |
| 12 through 24 | No Trigger |
| 25 | Combustor Liner Failure Trigger |
| 26 | Bleed Band Failure Trigger |

The combustor liner is a thermal coating disposed inside the engine combustor. The purpose of the combustor liner is to prevent burning fuel from overheating the walls of the combustion housing. A combustor-related failure may include cracking of the liner or a burn-through failure which could occur as a result of inferior baffle attachment welds or of a coked fuel nozzle resulting in poor fuel distribution and hot spots in a combustion chamber.

Bleed band related failures may generally occur more often than combustor liner failures. The most frequent failure mode of bleed band is bleed band leakage due to wear or improper sealing along the bleed band edge. Exhaust gas temperature sensors measure gas temperature at the exhaust of the turbine engine. In a typical sensor application, two thermocouple harness assemblies, each assembly having eight probes arranged on the circumference of a turbine nozzle containment ring, provide temperature signals to an engine electronic control unit.

At step 39, the matching cluster number may be used to determine whether the engine under analysis is normal or faulty. If the matching cluster number, found in Table 1, represents a faulty vector engine condition, this may be taken as an indication that the engine undergoing analysis may have a faulty condition and the diagnosis may conclude that the engine condition is determined to be faulty. If the matching cluster number represents a normal vector engine condition the engine diagnosis may conclude that the engine condition is determined to be normal. The matching cluster number may also be used to compute a distance from the observation to the matching cluster number, at step 41. Using the information obtained in steps 39 and 41, a diagnosis confidence level, or belief factor, may be obtained, at step 43. That is, the closer the observation, or set of input vectors, is to the cluster having the matching cluster number, the higher the confidence level that the observation does belong to the group corresponding to the cluster having the matching cluster number.

The belief factor can be computed in either of two ways. If the matching cluster number indicates that the engine condition is faulty, at step 39, the belief factor may be obtained by subtracting from unity the ratio of i) the distance between the current observation and the closest cluster identified by the matching cluster number (i.e., a closest distance) and ii) the distance between the current observation and the next closest cluster (i.e., a next-closest distance). Thus, for a faulty engine condition determination, the belief factor can be given by, $$BF_i^f = 1 - \frac{\|x_i - m_c\|}{\|x_i - m_{nc}\|}$$

where
 $x_i$ is the observation,
 $m_c$ is the matching cluster closest to $x_i$, and
 $m_{nc}$ is the next-closest cluster to $x_i$ If the matching cluster number indicates that the engine condition is normal, at step 39, the belief factor may be obtained by subtracting from unity the largest ratio among the set of ratios obtained by dividing i) the closest distance (i.e., between the current observation and the matching cluster) by ii) the fault distances between the current observation and each of the clusters in the set of all the clusters representing a faulty condition. That is, for a normal engine condition the following value is computed for a belief factor, $$BF_i^n = 1 - \max_f \left( \frac{\|x_i - m_c\|}{\|x_i - m_f\|} \right)$$

where $m_f$ is all clusters representing failures
 $\|x_i - m_f\|$ is the fault distance between the current observation and faulty condition cluster f.

Figure 2:
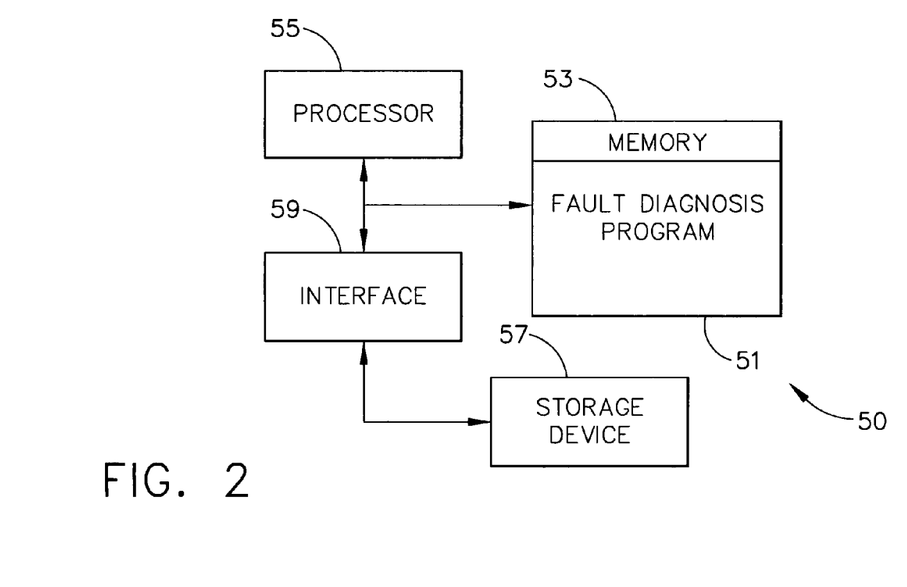
FIG. 2 shows a computing module or device which can be used to implement the method of FIGS. 1A and 1B.

As can be appreciated by one skilled in the relevant art, the disclosed method can be implemented by means of a computing module or device 50 such as shown in FIG. 2. The computing module 50 may comprise an application 51 in communication with a memory 53. The application 51 and the memory 53 may be provided on a computer drive (not shown) or may be provided via a computer-readable medium (not shown). The application 51 may be executed by a processor 55. The memory 53 may include fault diagnosis data such as the engine operating data collected in the field, the normalization factors, the baseline engine parameter distribution, and the derived belief factor. Some or all of the fault diagnosis data may be transmitted to a remote storage device 57 via an interface 59, which can be a wired or wireless connection such as the Internet. Alternatively, the fault diagnosis data may be resident in the storage device 57 for access by the application 51 and processor 55 as required.

It should be understood, of course, that the foregoing relates to exemplary embodiments of the invention and that modifications may be made without departing from the spirit and scope of the invention as set forth in the following claims.

We claim:

1. A method of analyzing a turbine engine to determine a normal engine condition or a faulty engine condition, said method comprising the steps of:
   acquiring at least one engine operating parameter;
   calculating at least one engine residual value from said at least one engine operating parameter;
   normalizing said at least one engine residual value to yield at least one normalized engine residual;
   mapping, via a clustering technique, said at least one normalized engine residual as at least one input vector into an engine condition space having a plurality of clusters, each of said plurality of clusters representing either a normal vector engine condition or a faulty vector engine condition;
   identifying a closest cluster within said engine condition space, said closest cluster being closer to said at least one input vector than any other of said plurality of clusters; and
   determining a normal engine condition for the engine undergoing analysis if said closest cluster represents a normal vector engine condition, and determining a faulty engine condition for the engine undergoing analysis if said closest cluster represents a faulty vector engine condition.

2. The method of claim 1 wherein said engine operating parameter is selected from the group consisting of: core speed, exhausted gas temperature, and fuel flow.

3. The method of claim 1 wherein said step of acquiring at least one engine operating parameter comprises the step of collecting engine operating data in the field.

4. The method of claim 1 wherein said step of calculating said at least one engine residual value comprises the step of comparing said at least one engine operating parameter with standard engine characteristics obtained from an empirical engine model.

5. The method of claim 4 wherein said empirical engine model comprises a polynomial function of engine fan speed.

6. The method of claim 4 wherein said empirical engine model comprises a neural network.

7. The method of claim 1 wherein said step of calculating said at least one engine residual value comprises the step of comparing said at least one engine operating parameter with standard engine characteristics obtained from a first principle engine model.

8. The method of claim 7 wherein said first principle engine model comprises a differential equation representing dynamics of the turbine engine.

9. The method of claim 1 wherein said step of normalizing comprises the step of normalizing a mean of said at least one engine residual value to zero.

10. The method of claim 1 wherein said step of normalizing comprises the step of normalizing a standard derivation of said at least one engine residual value to unity.

11. The method of claim 1 wherein said step of normalizing comprises the step of obtaining a normalization factor from a parameter distribution of a normally-operating baseline engine.

12. The method of claim 11 further comprising the step of deriving an updated normalization factor if said closest cluster represents a normal vector engine condition.

13. The method of claim 12 wherein said step of deriving an updated normalization factor comprises the steps of multiplying the square of a current mean normalization factor by a first fraction to obtain a first product; obtaining a current engine parameter from the turbine engine; multiplying said current engine parameter by a second fraction to obtain a second product; and adding said first and second products to yield an updated mean normalization factor.

14. The method of claim 12 wherein said step of deriving an updated normalization factor comprises the steps of multiplying the square of a current standard deviation normalization factor by a first fraction to obtain a first product; subtracting an updated mean normalization factor from said current engine parameter to obtain a first difference; multiplying the square of said first difference by a second fraction to obtain a second product; subtracting a current mean normalization factor from said current engine parameter to obtain a second difference; multiplying the square of said second difference by a third fraction to obtain a third product; and, taking the square root of said first, second, and third products to yield an updated standard deviation normalization factor.

15. The method of claim 1 wherein said clustering technique mapping comprises a self-organizing map.

16. The method of claim 15 further comprising the step of training said self-organizing map for a plurality of epochs using data from a plurality of turbine engines.

17. The method of claim 1 wherein said clustering technique mapping comprises a method from the group consisting of fuzzy clustering, adaptive resonance theory, K-means algorithm, and Gaussian mixture method.

18. The method of claim 1 further comprising the step of deriving a belief factor, said belief factor being a function of said normal vector engine condition or said faulty vector engine condition.

19. The method of claim 18 wherein, when said faulty engine condition is determined for the turbine engine, said belief factor comprises a value derived by subtracting from unity a ratio obtained by dividing a closest distance between said at least one input vector and said closest cluster by a next-closest distance between said at least one input vector and a next closest cluster.

20. The method of claim 18 wherein, when said normal engine condition is determined for the turbine engine, said belief factor comprises a value derived by subtracting from unity a maximum ratio of the set of ratios obtained by dividing a distance between said at least one input vector and said closest cluster by each of a set of respective fault distances between said at least one input vector and all clusters representing a faulty vector engine condition.

21. The method of claim 1 wherein said faulty engine condition is selected from the group consisting of: an exhaust temperature sensor failure, a combustor liner burn-through failure, and a bleed band leakage failure.

22. A computer readable medium having computer executable instructions comprising:
   calculating at least one engine residual parameter from data generated from a engine model and from engine operating data collected in the field from an engine undergoing analysis;
   normalizing said at least one engine residual value to yield at least one normalized engine residual;
   mapping via a clustering technique said at least one normalized engine residual as at least one input vector into an engine condition space having plurality of clusters, each of said plurality of clusters representing either a normal vector engine condition or a faulty vector engine condition;

identifying a closest cluster within said engine condition space, said closest cluster being closer to said at least one input vector than any other of said plurality of clusters; and determining a normal engine condition for the engine undergoing analysis if said closest cluster represents a normal vector engine condition, and determining a faulty engine condition for the engine undergoing analysis if said closest cluster represents a faulty vector engine condition.

23. The computer readable medium of claim 22 wherein said clustering technique mapping comprises a mapping from the group consisting of self-organizing mapping, fuzzy clustering, adaptive resonance theory, K-means algorithm, and Gaussian mixture method.

24. The computer readable medium of claim 22 further comprises engine operating data collected in the field are inputted into the computer.

25. The computer readable medium of claim 22 further comprises standard engine characteristics obtained from said engine model are inputted into the computer.

26. The computer readable medium of claim 22 further comprises normalization factors obtained from a normally-operating baseline engine are inputted into the computer.

27. The computer readable medium of claim 22 further comprises a closest distance between said at least one input vector and said closest cluster is calculated.

28. The computer readable medium of claim 27 further comprises a belief factor is calculated, in response to a determination of said faulty engine condition, by dividing said closest distance by a next-closest distance between said at least one input vectors and a next closest cluster and subtracting the result from unity.

29. The computer readable medium of claim 27 further comprises a belief factor is calculated, in response to a determination that the engine condition is normal, by subtracting from unity a maximum ratio from the set of ratios obtained by dividing said closest distance by each of a set of respective fault distances between said input vectors and the set of all clusters representing a faulty condition.

30. The computer readable medium of claim 27 further comprises data from a plurality of turbine engines is inputted into said self-organizing map to train said self-organizing map.

31. A method of analyzing a turbine engine to determine a normal engine condition or a faulty engine condition, said method comprising the steps of:

acquiring a plurality of engine operating parameters from the turbine engine under analysis;

calculating a corresponding plurality of engine residual values by comparing each of said engine operating parameters with standard engine characteristics obtained from an engine model;

computing the mean and the standard deviation of each of said plurality of engine residual values;

normalizing each of said plurality of engine residual values by normalizing said mean to zero and by normalizing said standard deviation to unity to yield a plurality of normalized engine residuals, said step of normalizing using normalization factors obtained from a parameter distribution of a normally-operating baseline engine;

mapping, via a clustering technique, said normalized engine residuals as input vectors into an engine condition space having a plurality of clusters, each said cluster representing either a normal vector engine condition or a faulty engine vector condition;

identifying a closest cluster within said engine condition space, said closest cluster being closer to said input vectors than any other of said plurality of clusters; and determining a normal engine condition for the engine under analysis if said closest cluster represents a normal vector engine condition, and determining a faulty engine condition for the engine under analysis if said closest cluster represents a faulty vector engine condition.

32. The method of claim 31 wherein said plurality of engine operating parameters comprises a core speed measurement, an exhausted gas temperature measurement, and a fuel flow measurement.

33. The method of claim 31 wherein said clustering technique mapping comprises a method from the group consisting of self-organizing mapping, fuzzy clustering, adaptive resonance theory, K-means algorithm, and Gaussian mixture method.

34. The method of claim 31 further comprising the step of deriving a belief factor wherein, if turbine engine condition is determined to be faulty, said belief factor comprises a value derived by subtracting from unity a ratio obtained by dividing a distance between said input vectors and said closest cluster by a distance between said input vectors and a next closest cluster, and wherein, if said engine is determined to be normal, said belief factor comprises a value derived by subtracting from unity a maximum ratio of the set of ratios obtained by dividing a distance between said input vectors and said closest cluster by each of the set of fault distances between said input vectors and all clusters representing a faulty condition.

35. A method of analyzing a turbine engine to determine a normal engine condition or a faulty engine condition, said method comprising the steps of:

inputting data into a self-organizing map from a plurality of reference turbine engines to train said self-organizing map;

acquiring a core speed reading, an exhaust gas temperature reading, and a fuel flow reading for the turbine engine under analysis;

calculating a core speed residual value, an exhaust gas temperature residual value, and a fuel flow residual value by comparing said core speed reading, said exhaust gas temperature reading, and said fuel flow reading with corresponding standard engine characteristics obtained from an engine model;

computing the mean and the standard deviation of each of said core speed residual value, said exhaust gas temperature residual value, and said fuel flow residual value;

normalizing each of said core speed residual value, said exhaust gas temperature residual value, and said fuel flow residual value by normalizing said respective means to zero and by normalizing said standard deviation to unity to yield a normalized core speed residual, a normalized exhaust gas temperature residual, and a normalized fuel flow residual, said step of normalizing using normalization factors obtained from a parameter distribution of a normally-operating baseline engine;

mapping, via said self-organizing map, said normalized core speed residual, said normalized exhaust gas temperature residual, and said normalized fuel flow residual as respective input vectors into an engine condition space having a plurality of clusters, each said cluster representing either a normal vector engine condition or a faulty vector engine condition; and identifying a closest cluster within said engine condition space, said closest cluster being closer to said input vectors than any other of said plurality of clusters; and, determining a normal engine condition for the engine under analysis if said closest cluster represents a normal vector engine condition, and determining a faulty engine condition for the engine under analysis if said closest cluster represents a faulty vector engine condition.

36. The method of claim 35 further comprising the step of calculating a closest distance between said at least input vectors and said closest cluster.

37. The method of claim 36 further comprising the step of calculating a belief factor for said faulty engine condition by dividing said closest distance by a next-closest distance between said input vectors and a next closest cluster and subtracting the result from unity.

38. The method of claim 36 further comprising the step of calculating a belief factor for said normal engine condition by subtracting from unity a maximum ratio from the set of ratios obtained by dividing said closest distance by a fault distance between said input vectors and the set of all clusters representing a faulty condition.

39. The method of claim 36 further comprising the step of deriving an updated normalization factor if said closest cluster represents a normal vector engine condition, said step of deriving an updated normalization factor including the steps of multiplying the square of a mean normalization factor by a first fraction to obtain a first product, obtaining a current engine parameter from the turbine engine, multiplying said current engine parameter by a second fraction to obtain a second product, and adding said first and second products to yield an updated mean normalization factor.

40. The method of claim 39 wherein said step of deriving an updated normalization factor further comprises the steps of multiplying the square of a current standard deviation normalization factor by a third fraction to obtain a third product; subtracting said updated mean normalization factor from said current engine parameter to obtain a first difference; multiplying the square of said first difference by a fourth fraction to obtain a fourth product; subtracting said mean normalization factor from said current engine parameter to obtain a second difference; multiplying the square of said second difference by said second fraction to obtain a fifth product; and, taking the square root of the sum of said third, fourth, and fifth products to yield an updated standard deviation normalization factor.

* * * * *